No. 736,959. Patented August 25, 1903.

UNITED STATES PATENT OFFICE.

GUSTAV GLOCK, OF BERLIN, GERMANY.

PROCESS OF OBTAINING PURE PYROLIGNEOUS ACID.

SPECIFICATION forming part of Letters Patent No. 736,959, dated August 25, 1903.

Application filed February 12, 1902. Serial No. 93,787. (No specimens.)

*To all whom it may concern:*

Be it known that I, GUSTAV GLOCK, a subject of the Grand Duke of Baden, residing at No. 23 Gleditschstrasse, Berlin, in the Kingdom of Prussia, German Empire, have invented an Improved Process of Purifying and Concentrating Pyroligneous Acid, (for which I have made application for Letters Patent in Germany, Serial No. G. 15,898, dated July 19, 1901; in Austria, dated November 27, 1901; in France, Serial No. 305,046, dated November 27, 1901; in Belgium, Serial No. 127,337, dated December 5, 1901, and in Hungary, Serial No. 17,548, dated December 12, 1901,) of which the following is a specification.

My invention relates to an improved process of treating raw or partly-purified pyroligneous acid with the view of simultaneously purifying and concentrating the same.

The raw pyroligneous acid obtained by the carbonization of wood contains, besides water, tar, and wood-alcohol, from six to twelve per cent. of acetic acid. The wood-alcohol may be easily separated from the pyroligneous acid by distillation; but distillation cannot be employed for eliminating the tar from the pyroligneous acid, because tar and tar-like matter have the property of passing over with the vapors of water and acetic acid when subjected to distillation. It is equally impossible to eliminate water from the pyroligneous acid—*i. e.*, to concentrate said acid by way of distillation. The only way hitherto found practicable to obtain pure acetic acid of high concentration has been to bind the aqueous pyroligneous acid to a base, to purify and concentrate the acetate obtained, and, finally, to decompose the said acetate by concentrated mineral acid.

For the purpose of purifying the pyroligneous acid the effort has been made to destroy the impurities therein contained by chemical, particularly by oxidizing, agents; but as the value of the aqueous pyroligneous acid is but small and the amount of impurities added is considerable the expense hitherto incurred in processes of this kind exceeded the value of the product obtained. For this reason no process of purification based upon the use of chemical means could be adopted in practice for operating on a large scale.

For the purpose of concentrating the pyroligneous acid various means tending to abstract water, such as concentrated sulfuric acid or anhydrous neutral salts, have been employed, but without practical success. If sulfuric acid be employed, it is impossible to subsequently separate the same entirely from the acetic acid, and besides the sulfuric acid has a chemical action upon the acetic acid and its impurities if temperature is raised to a certain degree, and, further, the diluted and impure sulfuric acid obtained by such treatment could not be easily concentrated at small expense for repeated use.

If anhydrous neutral salts be employed, it has been found that such salts not only crystallize with water of crystallization, but also with acetic acid, performing the same part in the crystals as water of crystallization does ordinarily, whereby the elimination of water from the acetic acid is rendered impossible. For these reasons none of the numerous processes proposed for concentration could be employed in practice on a large scale.

By the process of my invention hereinafter described I am able to perform in one operation the purification from tar and the abstraction of water from the pyroligneous acid, thus simultaneously purifying and concentrating the said acid.

This process is based upon the property of acid alkaline sulfates of not only eliminating tar-like matters from pyroligneous acid, but also of binding water in a higher degree than acetic acid.

It should be mentioned that Vincent has before made the observation on the occasion of preparing chemically-pure acetic acid that by decomposing pure crystallized acetate of soda by means of two equivalents of sulfuric acid the bisulfate of soda obtained binds the water of crystallization of the acetate of soda in such manner that during subsequent distillation strong acetic acid will pass over first and afterward aqueous acid; but observations of such kind have not been employed by Vincent for effecting the concentration of free acetic acid.

If bisulfate of soda is dissolved in raw pyroligneous acid previously freed of wood-alcohol, the greater part of the tar contained in the said acid will be separated, forming at the surface a stratum of oily matter, which may be removed by filtration or by drawing off the liquid solution below said stratum. The solution thus obtained is clear, of a yellow color of wine, and becomes turbid on standing. On subjecting this fluid to distillation acetic acid will pass over, showing already a high degree of purification. Though it still contains some tar, it will when bound to lime form an acetate of lime of eighty-seven up to ninety per cent., while by employing any process hitherto in use the acetate of lime obtained will only hold from eighty to eighty-two per cent. On examining the several fractions of distillation of the pyroligneous acid it will be found that provided the bisulfate was added in certain proportions further to be described the first fractions will deliver the strongest acid, while the following fractions will become weak and the latest fractions will consist only of water.

I have found that the acid alkaline sulfate which answers best is the primary sulfate of soda, ($NaHSO_4$,) called "bisulfate;" but the tri and tetra sulfates of sodium or of potassium might equally be employed with success. The primary sulfate of potassium ($KHSO_4$) is, however, in some way objectionable, for the reason that on reaching a certain degree of temperature and of concentration it will suddenly become solid, thereby setting free so much heat that the whole amount of water present will be converted into steam, causing almost an explosive effect. The proportions of the quantity of acetic acid and of the bisulfate to be added may vary within wide limits. They are determined by the result to be obtained—i. e., whether only purification of the acetic acid or its simultaneous concentration is to be effected.

If, as an example, an aqueous pyroligneous acid of six per cent. is being treated with one-half to two-thirds of its weight of bisulfate, the product of distillation will be nearly free of tar, but no concentration will be obtained. This mode of proceeding will be advisable if the raw pyroligneous acid contains a considerable quantity of tar. If the acid to be treated contains but a small quantity of tar, an addition of a double or treble quantity of bisulfate brought into the acid will not only lead to its purification, but also a high degree of concentration. A pyroligneous acid of high degrees of concentration will require comparatively inferior quantities of bisulfate to be added before distillation.

According to the quantity of bisulfate employed distillation may be carried on under a vacuum during the whole or part of the operation.

In carrying into practice the process of my invention I prefer to proceed as follows: Owing to the considerable amount of tar contained in the raw material at the beginning, the first distillation should be calculated rather to purify than to concentrate the pyroligneous acid. For this purpose between one and two parts of bisulfate are added to two parts of pyroligneous acid. The solution is prepared in a suitable receptacle by applying heat. When the tar has been separated, as already described, the clear and, if desired, filtered solution is brought into a still having neither column nor condenser, but being directly connected to the refrigerator. Distillation is now carried on, and it may be effected under a vacuum during the whole operation or only during part of it. The products of distillation are collected by fractions. Distillation is stopped as soon as almost nothing more is passing over or when the contents of the still are strongly foaming. Such foaming is caused by the tar, which being dissolved in the acid separates from the solution of bisulfate as the said solution becomes more and more concentrated. After stopping the process of distillation the contents of the still are brought back into the receptacle where the solution has been prepared, and while the said contents are still in a heated state a fresh quantity of raw pyroligneous acid to be treated is added, such quantity being equal to that which has passed over by distillation. The tar which has been separated from the solution during the first distillation, as described, will separate, together with the tar contained in said fresh quantity. Thus only one separation of tar will be required for each quantity under treatment. When the liquid has been withdrawn, it is again brought into the still and distillation carried on as before. The same operation is constantly repeated. The same bisulfate is employed over and over again for any number of repetitions.

The products of distillation obtained in the manner above described are further treated in the same manner. As has been stated before, the products of first distillation have been separated into fractions of different concentration. I collect those fractions of equal concentration and submit the same to another distillation by adding bisulfate, the quantity of which will vary between an equal portion up to the two-and-one-half-fold quantity, according to the state of concentration of the acid to be treated. If during such further distillation only a small amount of tar is found remaining in the still, it will be sufficient to separate the tar from the bisulfate only at the end of several successive operations, during which a greater amount of tar has been collecting. The presence of a trifling amount of tar is not objectionable, as by being separated from the liquid it loses its property of distilling over along with the vapors of water. The products of second distillation are again collected by fractions of different concentration. The fractions of equal concentration thereupon are again collected and submitted to further distillation by adding bisulfate in due proportion to the state of concentration of the acid. In this manner I proceed till the whole quantity of pyroligneous acid has been reduced to concentrated acid of sixty to seventy per cent. and residual water holding but from nothing to two per cent. of acid. If the raw material had been an acid of ten per cent., such final result will be obtained by two distillations calculated upon the original quantity of the pyroligneous acid under treatment. An acid of ten per cent. will render a degree of concentration of from thirty-five to forty per cent. by the first fraction of distillation, and by submitting said first fraction to another distillation the result will be a concentration to from sixty to seventy per cent. The remaining water, holding but a small percentage of acid, may preferably be treated in any known manner to form acetates, as it would not pay to push distillation further.

The concentrated acid received by repeated distillation is completely free of tar and ready for use in the arts. It could not be used, however, for alimentary purposes on account of its containing homologous acids. Chemically-pure acetic acid and glacial acetic acid, however, may be obtained from the product by any known process.

The novelty of my invention consists as well in the process of purifying the pyroligneous acid by eliminating the tar through the agency of a bisulfate and subsequent distillation, as also in the simultaneous concentration of the acid by means of fractioned distillation of a solution of bisulfate of pyroligneous acid.

The industrial merit of my invention consists in providing means for obtaining pure concentrated acetic acid without the necessity of employing the treatment by a salt of lime. My invention accordingly offers the considerable advantage of economy in lime, of sulfuric acid or hydrochloric acid, of apparatus employed, of mechanical power and labor required in the treatment as hitherto practiced.

I claim as my invention—

1. The process of preparing acetic acid from raw or partially-purified pyroligneous acid, consisting in adding to the pyroligneous acid an acid sulfate of an alkali, and distilling the resultant solution.

2. The process of preparing acetic acid from raw or partially-purified pyroligneous acid, consisting in adding to the pyroligneous acid an acid sulfate of an alkali, and distilling by fractionated operations the solution so prepared.

3. The process of preparing acetic acid from raw or partially-purified pyroligneous acid which consists in, first, dissolving an acid sulfate of an alkali in the pyroligneous acid, removing the tar, and subsequently distilling the solution so obtained.

4. The process of preparing acetic acid from raw or partially-purified pyroligneous acid, which consists in dissolving an acid sulfate of an alkali in the pyroligneous acid, filtering, and subsequently distilling said solution by fractionated operations.

5. The process of preparing acetic acid from raw or partially-purified pyroligneous acid, consisting in adding to the pyroligneous acid bisulfate of soda, and distilling the resultant solution.

6. The process of preparing acetic acid from raw or partially-purified pyroligneous acid, consisting in adding to the pyroligneous acid bisulfate of soda, and distilling by fractionated operations the solution so prepared.

7. The process of preparing acetic acid from raw or partially-purified pyroligneous acid, which consists in dissolving bisulfate of soda in the pyroligneous acid, filtering, and subsequently distilling said solution by fractionated operations.

In witness whereof I have hereunto set my hand in presence of two witnesses.

GUSTAV GLOCK.

Witnesses:
HENRY HASPER,
WOLDEMAR HAUPT.